(12) United States Patent
Suyama et al.

(10) Patent No.: US 8,178,228 B2
(45) Date of Patent: May 15, 2012

(54) SOLID-STATE BATTERY

(75) Inventors: Hiroshi Suyama, Mishima (JP); Koji Kawamoto, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/146,514

(22) PCT Filed: Feb. 19, 2009

(86) PCT No.: PCT/JP2009/052853
§ 371 (c)(1), (2), (4) Date: Jul. 27, 2011

(87) PCT Pub. No.: WO2010/095230
PCT Pub. Date: Aug. 26, 2010

(65) Prior Publication Data
US 2011/0287292 A1 Nov. 24, 2011

(51) Int. Cl.
*H01M 2/02* (2006.01)
*H01M 6/02* (2006.01)
*H01M 6/18* (2006.01)
*H01M 10/0562* (2010.01)
*H01M 10/0587* (2010.01)

(52) U.S. Cl. ........... 429/94; 429/133; 429/140; 429/164
(58) Field of Classification Search .................. 429/94, 429/133, 140, 141, 163, 164
See application file for complete search history.

(56) References Cited

U.S. PATENT DOCUMENTS
2006/0246355 A1  11/2006  Min et al.

FOREIGN PATENT DOCUMENTS
| JP | 9 35751 | | 2/1997 |
| JP | 2001060465 A | * | 3/2001 |
| JP | 2001 236937 | | 8/2001 |
| JP | 2002 280073 | | 9/2002 |
| JP | 2006 310033 | | 11/2006 |
| JP | 2006 310295 | | 11/2006 |

OTHER PUBLICATIONS

Hayashi et al., "Formation of Li+ superionic crystals from the Li2S-P2S5 melt-quenched glasses"; J. Mater. Sci. 43:1885-1889 (Jan. 31, 2008).*
International Search Report issued May 19, 2009 in PCT/JP09/52853 filed Feb. 19, 2009.

* cited by examiner

*Primary Examiner* — Gregg Cantelmo
(74) *Attorney, Agent, or Firm* — Oblon, Spivak, McClelland, Maier & Neustadt, L.L.P.

(57) ABSTRACT

The present invention provides an all-solid-state battery capable of improving output power. The all-solid-state battery includes a wound solid electrolyte/electrode assembly and a case housing the solid electrolyte/electrode assembly with a pressurized fluid being filled between the inner periphery surface of the case and the solid electrolyte/electrode assembly.

9 Claims, 3 Drawing Sheets

SOLID-STATE BATTERY

TECHNICAL FIELD

The invention relates to an all-solid-state battery including a solid electrolyte.

BACKGROUND ART

A lithium-ion secondary battery has characteristics of having a higher energy density and being operable at a higher voltage than other secondary batteries. Therefore, it is used as a secondary battery, which can be easily reduced in size and weight, for information equipment such as cellular phones. In recent years, there is an increasing demand for use of the lithium-ion secondary battery as a large-size power source for hybrid vehicles or the like.

The lithium-ion secondary battery includes a positive electrode layer, a negative electrode layer, and an electrolyte disposed therebetween. The electrolyte includes a nonaqueous liquid or a solid. When the nonaqueous liquid (hereinafter referred to as an "electrolytic solution") is used for the electrolyte, the electrolytic solution penetrates the inside of the positive electrode layer. Thus, an interface between a positive electrode active material forming the positive electrode layer and the electrolyte is easily formed, resulting in improvement of the performance. However, since a widely-used electrolytic solution is combustible, it is necessary to have a system for ensuring safety. On the other hand, since a solid electrolyte is noncombustible, the system may be simplified. Consequently, there is suggested a lithium-ion secondary battery including a noncombustible solid electrolyte (hereinafter sometimes referred to as a "solid electrolyte layer").

In the case of a lithium-ion secondary battery having a solid electrolyte layer arranged between a positive electrode layer and a negative electrode layer (hereinafter sometimes referred to as an "all-solid-state battery"), interfaces between the electrolyte and the positive electrode active material and the negative electrode active material are interfaces between solids (solid/solid interfaces). The ion conductive resistance at the solid/solid interface increases easily as compared with that at a solid/liquid interface. Thus, in the case of the all-solid-state battery, it is necessary to reduce the ion conductive resistance at the solid/solid interface (hereinafter referred to as "interface resistance") by applying pressure to the solid/solid interface.

As a technique related to such an all-solid-state battery, for example, an all-solid-state battery including a wound electrode body formed by winding belt-like positive and negative electrodes through a solid electrolyte and a separator is disclosed in Patent Literature 1.

CITATION LIST

Patent Literature

Patent Literature 1: JP-A-2002-280073

SUMMARY OF INVENTION

Technical Problem

It is considered that the configuration including the wound electrode body like the technique disclosed in Patent Literature 1 can achieve high energy density. However, even if an electrode body is simply wound like the technique disclosed in Patent Literature 1, it is difficult to reduce the interface resistance and improve output power unless a predetermined bonding pressure is applied to the solid/solid interface.

An object of the present invention is to provide an all-solid-state battery capable of improving output power.

Solution to Problem

In order to achieve the above object, the present invention takes the following means. That is, the present invention is an all-solid-state battery including a wound solid electrolyte/electrode assembly and a case housing the solid electrolyte/electrode assembly with a pressurized fluid being filled between the inner periphery surface of the case and the solid electrolyte/electrode assembly.

The term "wound solid electrolyte/electrode assembly" herein means a structure formed by winding a positive electrode layer and a negative electrode layer through a solid electrolyte layer and a separator. For example, it also means a structure produced by winding a laminate formed by stacking a belt-like assembly in which a solid electrolyte layer is connected with a positive electrode layer, a separator, a belt-like assembly in which the solid electrolyte layer is connected with a negative electrode layer, and a separator in this order.

In the invention, it is preferable that the fluid be an insulating liquid.

Advantageous Effects of Invention

In the all-solid-state battery of the present invention, a pressurized fluid is filled between the inner periphery surface of the case and the solid electrolyte/electrode assembly. Thus, a pressure can be applied from the fluid to the solid electrolyte/electrode assembly. If the pressure is applied in this manner, the pressure may be uniformly applied to the contact interface between the solid electrolyte and the positive electrode active material and the contact interface between the solid electrolyte and the negative electrode active material, thereby reducing the interface resistance. The reduction of the interface resistance can improve the output power. Therefore, the present invention can provide an all-solid-state battery capable of improving the output power.

In the present invention, the fluid which is filled between the solid electrolyte/electrode assembly and the inner periphery surface of the case is an insulating liquid, which facilitates an improvement on the output power.

REFERENCE SIGNS LIST

Figure 1:
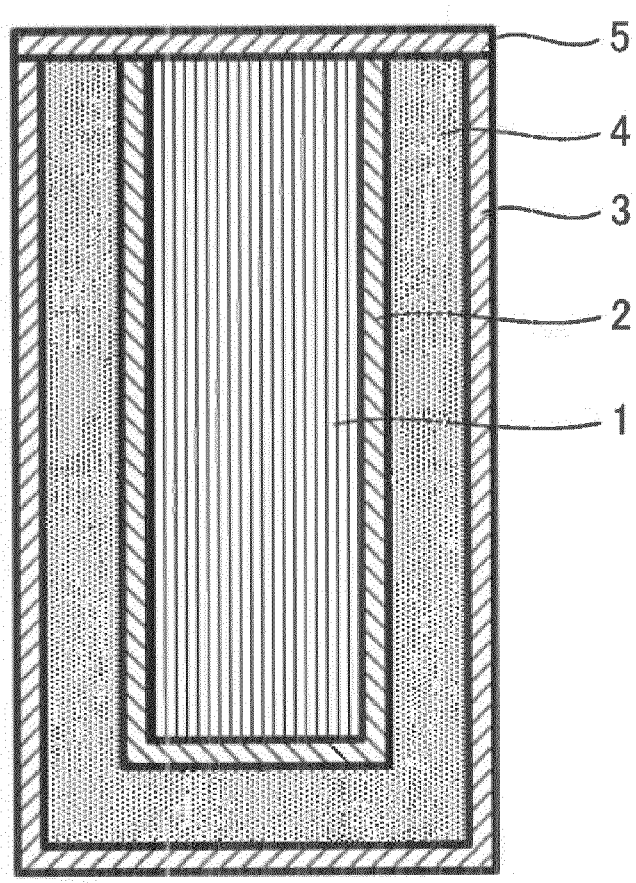
FIG. 1 is a cross-sectional view showing an embodiment of an all-solid-state battery 10.

1 Solid electrolyte/electrode assembly
1a Positive electrode layer
1b Negative electrode layer
1c Solid electrolyte layer
1d Separator
1e Positive electrode mixture layer
1f Positive electrode current collector
1g Negative electrode mixture layer
1h Negative electrode current collector
1x Assembly 1y Assembly
2 Cylindrical body
3 Case
4 Liquid
5 Lid
10 All-solid-state battery

DESCRIPTION OF EMBODIMENT

Hereinafter, the present invention will be described with reference to the drawings. The following embodiment is an exemplification of the present invention which is not limited thereto.

Figure 2:
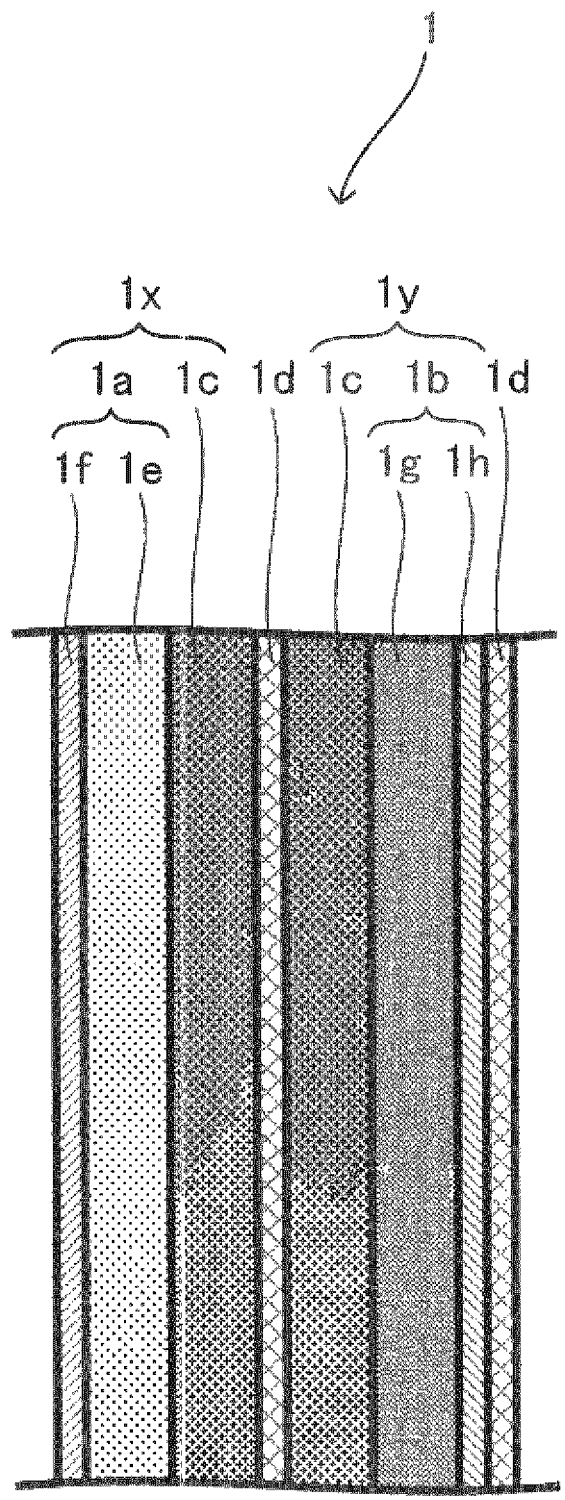
FIG. 2 is an enlarged cross-sectional view of a part of the solid electrolyte/electrode assembly.
Figure 3:
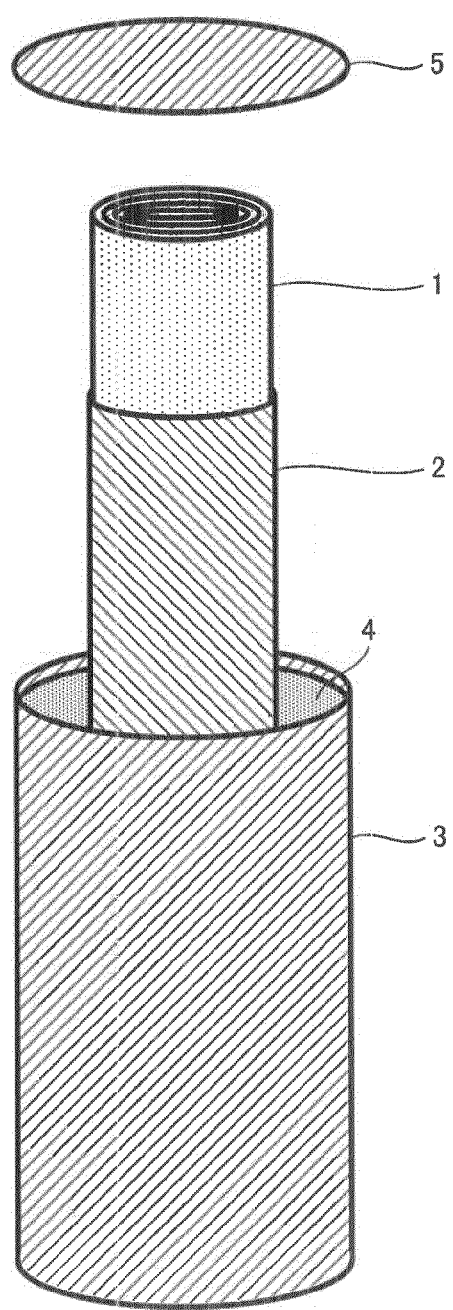
FIG. 3 is a disassembled view of the all-solid-state battery 10.

FIG. 1 is a simplified cross-sectional view of an embodiment of an all-solid-state battery 10 of the present invention. FIG. 1 mainly illustrates the characteristic configuration of the all-solid-state battery 10, omitting the description of known configurations appropriately. FIG. 2 is an enlarged cross-sectional view of a part of a solid electrolyte/electrode assembled electrode body included in the all-solid-state battery 10. FIG. 3 is a disassembled view of the all-solid-state battery 10. FIG. 3 is a simplified view of the embodiment of the all-solid-state battery 10.

As shown in FIGS. 1 to 3, the all-solid-state battery 10 includes a wound solid electrolyte/electrode assembly 1, a cylindrical body 2 housing the solid electrolyte/electrode assembly 1, and a case 3 housing the cylindrical body 2. Further, a pressurized liquid 4 is filled between the outer periphery surface of the cylindrical body 2 and the inner periphery surface of the case 3, and the space inside the case 3 which is covered with a lid member 5 is sealed. Such a configuration allows pressure to be applied to the cylindrical body 2 from the liquid 4 which is filled outside the cylindrical body. Thus, the pressure can be applied from the outside of the solid electrolyte/electrode assembly 1 to the solid electrolyte/electrode assembly 1 by using the cylindrical body 2 configured to enable transmission of the pressure applied from the liquid 4 to the solid electrolyte/electrode assembly 1. If the pressure is applied in this manner, the pressure can be applied to the solid/solid interface between the solid electrolyte and the positive electrode active material and the solid/solid interface between the solid electrolyte and the negative electrode active material, thereby allowing the interface resistance at the solid/solid interfaces to be reduced. The reduction of the interface resistance can improve the output power. Therefore, the present invention provides the all-solid-state battery 10 which can improve output power. Hereinafter, the all-solid-state battery 10 will be described component by component.

<Solid Electrolyte/Electrode Assembly 1>

The solid electrolyte/electrode assembly 1 has a structure in which a positive electrode layer 1a and a negative electrode layer 1b are wound through a solid electrolyte layer 1c and a separator 1d, and has a so-called jelly roll type structure. The solid electrolyte/electrode assembly 1 is formed by winding a laminate obtained by stacking a belt-like assembly 1x in which the solid electrolyte layer 1c is connected with the positive electrode layer 1a, a separator 1d, a belt-like assembly 1y in which the solid electrolyte layer 1c is connected with the negative electrode layer 1b, and a separator 1d.

The positive electrode layer 1a has a structure in which a positive electrode current collector 1f is in contact with a positive electrode mixture layer 1e. The positive electrode mixture layer 1e contains a positive electrode active material which occludes and releases lithium ions, a solid electrolyte, and a conductive material. These materials are uniformly mixed through a binding material. Known positive electrode active materials usable for the all-solid-state battery may be used for the positive electrode active material contained in the positive electrode mixture layer 1e. Specific examples of the positive electrode active materials include lithium cobalt oxide. Known solid electrolytes usable for the all-solid-state battery may be used for the solid electrolyte contained in the positive electrode mixture layer 1e. Specific examples of the solid electrolytes usable include $Li_7P_3S_{11}$. Known conductive materials usable for the all-solid-state battery may be used for the conductive material contained in the positive electrode mixture layer 1e. Specific examples of the conductive materials include carbon materials represented by carbon black. Known binding materials usable for the positive electrode layer of the all-solid-state battery may be used for the binding material contained in the positive electrode mixture layer 1e. Specific examples of the binding materials include synthetic rubber such as fluorine rubber and polymeric materials such as polyvinylidene fluoride. Known materials usable for the positive electrode current collector of the all-solid-state battery may be used for the positive electrode current collector 1f. For example, an aluminum foil or nickel foil may be used as the positive electrode current collector 1f.

The negative electrode layer 1b has a structure in which a negative electrode current collector 1h is in contact with a negative electrode mixture layer 1g. The negative electrode mixture layer 1g contains a negative active material which occludes and releases lithium ions, a solid electrolyte, and a conductive material. These materials are uniformly mixed through a binding material. Known negative electrode active materials usable for the all-solid-state battery may be used for the negative electrode active material contained in the negative electrode mixture layer 1g. Specific examples of the negative electrode active materials include carbon materials such as graphite. Those similar to the solid electrolyte, conductive material, and binding material usable for the positive electrode mixture layer 1e may be used for the solid electrolyte, conductive material, and binding material contained in the negative electrode mixture layer 1g. Known materials usable for the negative electrode current collector of the all-solid-state battery may be used for the negative electrode current collector 1h. For example, a copper foil or nickel foil may be used as the negative electrode current collector 1h.

The solid electrolyte layer 1c contains a solid electrolyte having lithium ion conductivity and not having electrical conductivity. Known solid electrolytes usable for the all-solid-state battery may be used for the solid electrolyte contained in the solid electrolyte layer 1c. Specific examples of the solid electrolytes include $Li_7P_3S_{11}$.

The separator 1d is a member which separates the positive electrode layer 1a from the negative electrode layer 1b, and is disposed to prevent short-circuiting or the like caused by the contact between the positive electrode active material and the negative electrode active material. The separator 1d may include a known material usable for the all-solid-state battery. Examples of the separator 1d include porous membranes formed of resins, such as polytetrafluoroethylene (PTFE) and polypropylene (PP), and ceramic porous membranes.

<Cylindrical Body 2>

The cylindrical body 2 is a structure which is used to prevent a confining pressure, when externally applied, from being insufficiently applied to a solid/solid interface between electrolyte/electrode interfaces due to penetration of the liquid 4 into the electrolyte/electrode interfaces. The structure of the cylindrical body 2 in the all-solid-state battery 10 is not particularly limited as long as it may transmit the pressure applied from the liquid 4 to the solid electrolyte/electrode assembly 1. Specific examples of the component of the cylindrical body 2 include insulating materials such as polymer (PP, PE, etc.) and polymer-coated aluminum foil. The thickness of the cylindrical body 2 may be set to, for example, 0.05 µm or greater and 3 mm or less.

<Case 3>

The case 3 is a member that houses the solid electrolyte/electrode assembly 1, the cylindrical body 2, and the pressurized liquid 4, and has its internal space sealed with the lid 5 put on the case 3. The structure of the case 3 is not particularly limited as long as it includes a material which can withstand the pressure of the liquid 4 sealed in a pressurized state, does not react with the liquid 4, and can endure an environment during the use of the all-solid-state battery 10. Specific examples of the component of the case 3 include Ni steel.

<Liquid 4>

The liquid 4 in a pressurized state is filled in the case 3 and applies pressure to the solid electrolyte/electrode assembly 1 to thereby serve to reduce the resistance of the solid/solid interface between the solid electrolyte and the positive electrode active material as well as the solid/solid interface between the solid electrolyte and the negative electrode active material. The liquid 4 is not particularly limited as long as it is a liquid which may exhibit such a function. From the viewpoint of preventing problems, such as short-circuiting and electric leakage caused by penetration of the liquid 4 into the electrode because of the presence of a gap in the cylindrical body 2, it is preferable that the liquid 4 be an insulating liquid. From the viewpoint of ensuring the safety when using the all-solid-state battery 10, it is preferable that the liquid 4 be noncombustible. From the viewpoint of allowing a pressure to be applied to the solid electrolyte/electrode assembly 1 over a long period of time, it is preferable that the liquid 4 be nonvolatile. Specific examples of the liquid 4 include insulating oils containing mineral oil, alkylbenzene, polybutene, alkylnaphthalene, alkyldiphenylalkane, silicone oil or the like as a main component. Further, the method of applying the pressurized liquid 4 to the case 3 in the all-solid-state battery 10 is not particularly limited, and the liquid may be filled by any known method. For example, when the insulating oil is used as the liquid 4, the all-solid-state battery 10 may be produced by processes of placing the cylindrical body 2 housing the solid electrolyte/electrode assembly 1 in the case 3, filling the insulating oil, pressurized by filling inert gas such as nitrogen gas, into the case 3, and then sealing the case 3 with the lid 5.

In the all-solid-state battery 10, the pressure of the liquid 4 housed in the sealed case 3 is not particularly limited as long as the pressure is sufficient to reduce the interface resistance and can be applied to the solid electrolyte/electrode assembly 1. The pressure of the liquid 4 may be set to, for example, 0.2 MPa or greater and 100 MPa or less.

<Lid 5>

An opening of the case 3 is blocked by the lid 5 to seal inside of the case 3 housing the solid electrolyte/electrode assembly 1, the cylindrical body 2, and the liquid 4. The embodiment of the lid 5 is not particularly limited as long as it includes a material which can endure the pressure of the liquid 4 sealed in a pressurized state, does not react with the liquid 4, and can endure an environment during the use of the all-solid-state battery 10. Specific examples of the component of the lid 5 include Ni steel.

Although the above explanation on the all-solid-state battery 10 of the present invention has exemplified the embodiment including the cylindrical body 2; however, the all-solid-state battery of the present invention is not limited to the embodiment. When the liquid 4 having an insulation property is used, the all-solid-state battery may not include the cylindrical body 2.

Although the above explanation on the all-solid-state battery 10 of the present invention has exemplified the embodiment in which the pressurized liquid is filled between the solid electrolyte/electrode assembly 1 and the inner periphery surface of the case 3; however, the all-solid-state battery of the present invention is not limited to the embodiment. In the all-solid-state battery of the present invention, a jelly-like fluid that is pressurized or a pressurized gas may be filled between the solid electrolyte/electrode assembly and the inner periphery surface of the case. From the viewpoint of the structure which easily enables uniform application of pressure from the outside of the solid electrolyte/electrode assembly, it is preferable that a pressurized liquid be filled between the solid electrolyte/electrode assembly and the inner periphery surface of the case.

Although the above explanation on the all-solid-state battery 10 of the present invention has exemplified the embodiment including the positive electrode layer 1a having the positive electrode mixture layer 1e and the negative electrode layer 1b having the negative electrode mixture layer 1g; however, the all-solid-state battery of the present invention is not limited to the embodiment. The all-solid-state battery of the present invention may be configured to include a negative electrode layer including an In foil.

Although the above explanation on the all-solid-state battery 10 of the present invention has exemplified the embodiment including the positive electrode active material and the negative electrode active material which are capable of occluding and releasing lithium ions; however, the all-solid-state battery of the present invention is not limited to the embodiment. The all-solid-state battery of the present invention may be applied to, for example, an all-solid-state battery in which sodium ions migrate.

Industrial Applicability

The all-solid-state battery of the present invention may be used as a power source for electric vehicles, information equipment, or the like.

The invention claimed is:

1. A battery, comprising:
   a wound electrolyte/electrode assembly;
   a cylindrical body housing the electrolyte/electrode assembly;
   a case housing the cylindrical body;
   a lid member sealing an internal space of the case; and
   a pressurized fluid that fills the internal space, which abuts an outer periphery surface of the cylindrical body and an inner periphery surface of the case.

2. The battery according to claim 1, wherein the fluid is an insulating liquid.

3. The battery according to claim 1, wherein the internal space is delimited in part by an inside surface of the lid member.

4. The battery according to claim 1, wherein the pressurized fluid contacts an inside surface of the lid member.

5. The battery according to claim 1, wherein a pressure of the pressurized fluid induces pressure between an interface of a solid electrolyte and a positive electrode material of the electrolyte/electrode assembly.

6. The battery according to claim 1, wherein the electrolyte/electrode assembly has a jelly roll structure including a solid electrolyte and a positive electrode material wound together.

7. The battery according to claim 1, wherein a pressure of the pressurized fluid in the case ranges from 0.2 MPa to 100 MPa.

8. The battery according to claim 1, wherein the lid member seals the cylindrical body.

9. The battery according to claim 1, wherein the wound electrolyte/electrode assembly includes
- a positive electrode layer,
- a negative electrode layer,
- a solid electrolyte layer having a first solid/solid interface with the positive electrode layer and a second solid/solid interface with the negative electrode layer, and
- a separator that separates the positive electrode layer and the negative electrode layer.

* * * * *